Aug. 18, 1970   H. W. NEUBERT   3,524,277
TROLLING DEVICE
Filed Oct. 28, 1968
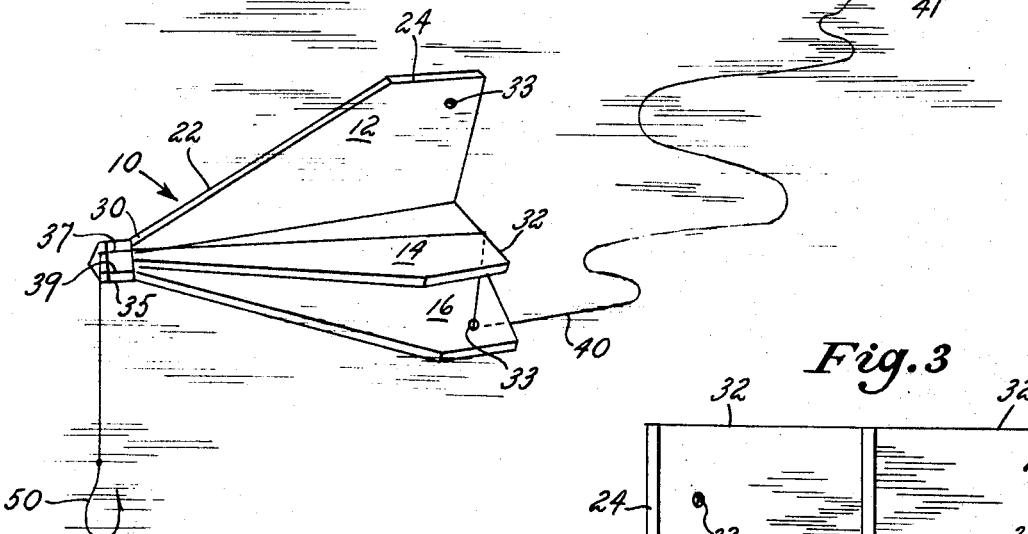
Fig.1
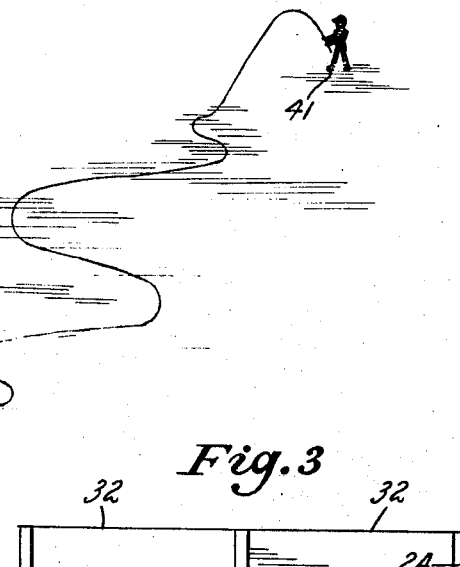
Fig.3
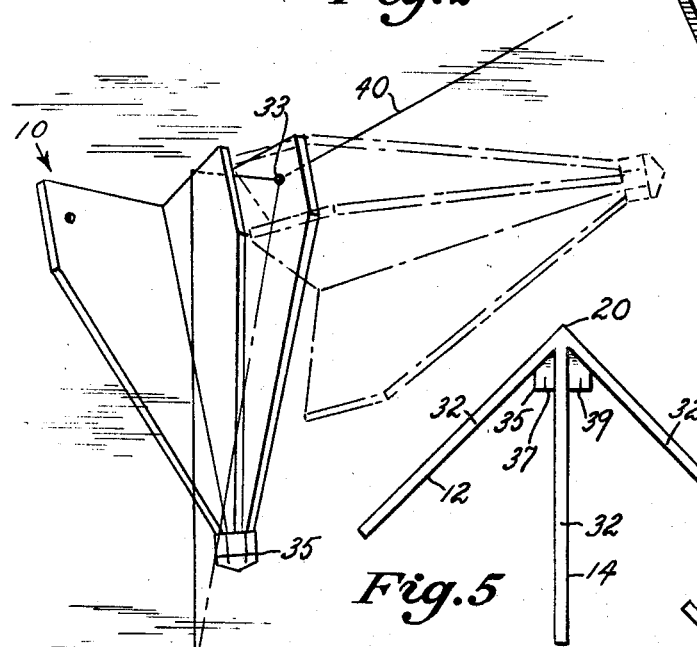
Fig.2
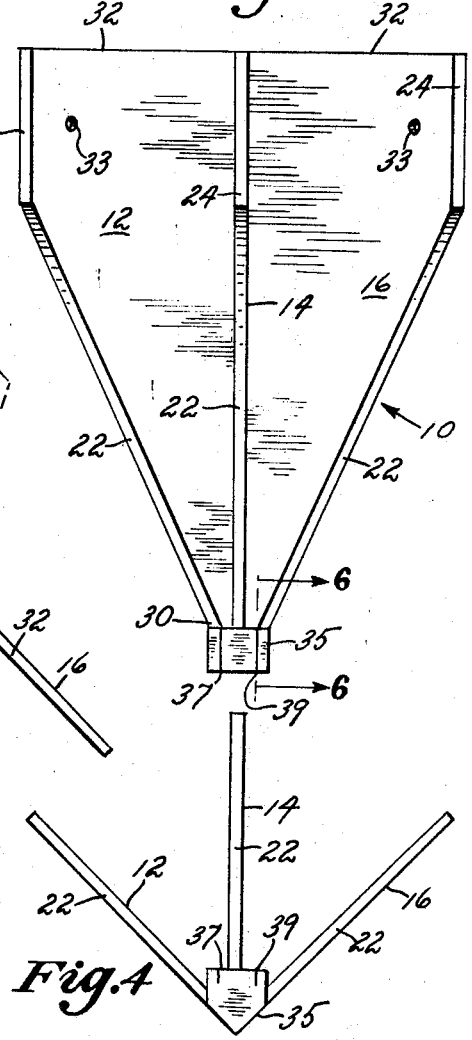
Fig.5
Fig.4
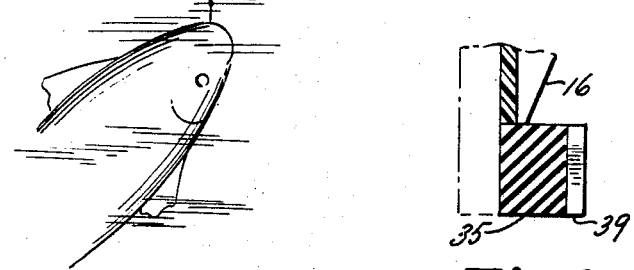
Fig.6
INVENTOR.
HARRY W. NEUBERT
BY Herbert Smith Sylvester
ATTORNEY United States Patent Office 3,524,277
Patented Aug. 18, 1970

3,524,277
TROLLING DEVICE
Harry W. Neubert, Gateway Apts. 44C33,
Center Grove Road, Dover, N.J. 07801
Filed Oct. 28, 1968, Ser. No. 770,976
Int. Cl. A01k 93/00
U.S. Cl. 43—43.13
6 Claims

ABSTRACT OF THE DISCLOSURE

A trolling device for use with a line which comprises a pair of tapered vanes, a frictional line-clamp at the forward tip of the vanes, a line snubber at the rear of the device between the vanes, and a passageway for the line at the trailing edge of one of the vanes such that the device effects trolling action while the line is engaged by the clamp, the snubber and the passageway and ceases trolling action when the line becomes disengaged from the clamp and snubber and remains engaged only by the passageway.

This invention relates to trolling devices. More particularly, it relates to trolling devices for use with a line, such as a fishing line, in which trolling or line-advancing action is accomplished by virtue of the coaction on the device of the forces of fluid pressure (e.g., from current flow) and line restraint. The trolling device of the instant invention exhibits a planing action, tending to maintain itself near the surface of the body of fluid in which it is used and to advance the line with which it is employed in a course substantially normal to the direction of current flow.

Various other advantages and objects of the invention will become more fully apparent from consideration of the following description of the drawing, which illustrate a presently preferred embodiment of the invention.

In the drawings:

FIG. 1 is a view in perspective (but not to scale) of the instant embodiment as used for fishing;

FIG. 2 is another view in perspective showing by means of a dotted outline the re-disposition of the device on a line which occurs when the line is disengaged from the front tip of the device, as when a fish strikes;

FIG. 3 is a plan view of the device taken longitudinally along the length of the center vane thereof;

FIG. 4 is a view in elevation of the device of FIG. 3 taken from the forward, tapering end thereof;

FIG. 5 is a rear view of the device of FIG. 3; and

FIG. 6 is an enlarged partial view in section taken along the plane 6—6 of FIG. 3.

As shown in the figures, the device (indicated generally by the reference character 10) is comprised of three elongated vanes 12, 14, and 16. These vanes are of identical truncated triangular outline, are disposed at 45-degree angles to each other, are joined at an apex 20 along common longitudinal edges to form a symmetrical, bisected angle section body. The leading edge 22 of each vane 12, 14 and 16 tapers gradually laterally from its truncated, outwardly-projecting squared-off wing tip 24 to a substantially pointed forward tip 30. The trailing edge 32 of each vane is substantially normal to the apex 20. The vanes are made of a rigid plastic, i.e., polymethylmethacrylate, and the outer vanes 12 and 16 are each pierced on their trailing edges near their truncated wing tips by passageways 33.

Affixed to the forward tip 30 of the device by a suitable cement is a block 35 of rubber which is traversed in a direction longitudinally of the device by two slits 37 and 39 disposed on opposite sides of the central vane 14.

In use, a fishing line 40 (supplied by an operator 41) is threaded through a passageway 33 in an outer vane 16, across the opening at the back of the device and over the trailing edge 32 of the center vane 14, and along the face of the center vane 14 remote from the passageway 33 (in the vane 16 through which the line is threaded) to the tip 35 of the device, where it is embedded into and clamped by the corresponding slit 37 (nearest said face in the rubber block 35. The line 40 terminates several feet beyond the point at which it is clamped in the rubber block 35 and a hook 50 (or a lure and hook as appropriate) is affixed to the end of the line.

Under the influence of the current of a stream or river, the instant trolling device will advance itself and the line which it carries away from source of the line at substantially right angles to the direction of the current, and will remain near the surface while the line is in the disposition shown in FIG. 1. However, when a fish strikes and takes the hook 50, the force of the fish's play on the line withdraws it from the slit 37 (or 39) in which it is frictionally held in the rubber block 35, as illustrated in FIG. 2. The device 10 then pivots as a result of the simultaneous forces of the line on the trailing edge 32 of the center vane 14 and on the passageway 33, and also of the water on the vanes 12, 14 and 16, and assumes substantially the position shown in dotted outline in FIG. 2. In the thus unrestrained position illustrated in dotted outline in FIG. 2, the device is free and slides down the few feet of line to the hook 50 (or other obstruction if provided), in which position it no longer effects any trolling or planing action and permits substantially free play of the fish on the hook 50.

From the foregoing it will be apparent that the instant device exhibits substantially less water resistance at the front end 30 leading to the fishing hook than it does at the rear end leading to the source of line 40, that the passageway 33 which acts as an un-disengageable retainer for the line is disposed behind the center of resistance (to fluid flow) of the device and laterally of its plane of longitudinal symmetry. Preferably also, the intermediate guide or snubber for the line (which takes the form of the trailing edge 32 of the center vane 14 in the embodiment shown) is disposed to the rear of the passageway 33 to insure that the line follows an acute angle in its path about the center vane, thus effecting improved trolling and disengaging actions.

I claim:

1. A trolling device for use with a line which comprises a pair of elongated vanes joined together angularly along a common apex, said vanes tapering laterally to a forward tip, a frictional line-clamp disposed at said forward tip, a line snubber disposed aft of said clamp and between said vanes, and a passageway for said line disposed in the trailing portion of one of said vanes adapted to permit the said line to extend therethrough from the outer side inwardly toward the other vane, over the snubber to the other side thereof, and thence forwardly to be releasably engaged by the said frictional line clamp, whereby when said line is engaged by the clamp, the snubber and the passageway, the pressure of flowing fluid on said vanes will effect trolling action by said device on said line, and disengagement of said line from said clamp will incur disengagement from the snubber but not from the passageway, whereupon said device will pivot on said line at said passageway and trolling action will cease.

2. A trolling device as set forht in claim 1 in which said vanes are normal to each other.

3. A trolling device as set forth in claim 1 in which said snubber is disposed aft of said passageway.

4. A trolling device as set forth in claim 1 in which said snubber is a vane intermediate said pair of vanes.

5. A trolling device as set forth in claim 1 in which said frictional line-clamp is a slit rubber block.

6. A trolling device as set forth in claim 1 in which said vanes are coextensive.

References Cited
UNITED STATES PATENTS

| | | | |
|---|---|---|---|
| 2,273,209 | 2/1942 | Louthan | 43—43.13 |
| 2,473,644 | 6/1949 | Groza | 43—43.13 |
| 2,482,343 | 9/1949 | Ingleton | 43—44.88 |

SAMUEL KOREN, Primary Examiner

D. J. LEACH, Assistant Examiner

U.S. Cl. X.R.

43—44.88